United States Patent
McFarthing

(10) Patent No.: US 11,450,161 B1
(45) Date of Patent: Sep. 20, 2022

(54) ACCESS AND COMMUNICATION USING NEAR ULTRA LOW ENERGY FIELDS

(71) Applicant: QUALCOMM Incorporated, San Diego, CA (US)

(72) Inventor: Anthony McFarthing, Ely (GB)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/186,700

(22) Filed: Feb. 26, 2021

(51) Int. Cl.
  *G07C 9/00* (2020.01)
  *H01Q 1/32* (2006.01)

(52) U.S. Cl.
  CPC ..... *G07C 9/00309* (2013.01); *G07C 9/00857* (2013.01); *H01Q 1/3241* (2013.01); *G07C 2009/00555* (2013.01); *G07C 2009/00865* (2013.01)

(58) Field of Classification Search
  None
  See application file for complete search history.

(56) References Cited

U.S. PATENT DOCUMENTS

| | | | |
|---|---|---|---|
| 6,985,121 B1 | 1/2006 | Bogdans et al. | |
| 2013/0281016 A1* | 10/2013 | McFarthing | H04B 5/00 455/41.1 |
| 2014/0232589 A1* | 8/2014 | Trotta | G01S 7/282 342/175 |
| 2015/0319545 A1* | 11/2015 | Kerselaers | G16H 20/40 381/315 |
| 2018/0167876 A1* | 6/2018 | McFarthing | H04W 52/0209 |
| 2018/0367187 A1* | 12/2018 | McFarthing | H04B 5/0031 |
| 2019/0327778 A1* | 10/2019 | Morris | H04B 17/309 |
| 2020/0068400 A1* | 2/2020 | Ramic | H04L 63/102 |
| 2021/0204105 A1* | 7/2021 | McFarthing | H04W 76/15 |

OTHER PUBLICATIONS

International Search Report and Written Opinion—PCT/US2021/065621—ISA/EPO—dated May 9, 2022.

* cited by examiner

*Primary Examiner* — Carlos Garcia
(74) *Attorney, Agent, or Firm* — Muncy, Geissler, Olds & Lowe, P.C.

(57) ABSTRACT

Use of a Near Ultra-low Energy Field (NULEF) communications as a non-radiating means of gaining entry to a car when the car owner is near the car or touching the car body avoids the use of problematic radio signals that may be intercepted by thieves. In addition, a NULEF communications system may be used as a high bandwidth in-car communication system using either NULEF-E or NULEF-H.

24 Claims, 11 Drawing Sheets

ACCESS AND COMMUNICATION USING NEAR ULTRA LOW ENERGY FIELDS

FIELD OF DISCLOSURE

This disclosure relates generally to access and communication using energy fields, and more specifically, but not exclusively, to access and communication of a vehicle using a near-field communications system.

BACKGROUND

A near-field communications system is a short range wireless communications system that communicates by coupling a tight, low-power, field between devices. Near Ultra-low Energy Field (NULEF) communications, a type of near-field communications, are similar to short range communications such as Near Field Communication (NFC) which has short-range and low-power capabilities, and the communication of data between a NULEF transmitter and a NULEF receiver is achieved by means of field induction. The typical field induction used was a magnetic field based on a NULEF communication system previously called NULEF (Near Ultra Low Energy Field). When a magnetic field is used, the communication system is referred to as NULEF-H (H symbol Magnetic Field Strength). However, in the novel approach of using an electric field, the communications system is referred to as NULEF-E (E symbol for Electric Field Strength).

Near-field magnetic communication devices (such as NULEF devices or body worn devices) using magnetic fields have some advantages over radio communications, such as power dissipation and beneficial fading characteristics and may be used for a number of applications similar to the use of radios. However, radios are still prevalent today in various applications as are their associated drawbacks.

For aspect, car thefts have been highlighted recently as an increasing trend partially due to the relatively new methods developed for unlocking a car using radio access techniques. Thieves can record encrypted codes over the air that can then be played back by the thieves to gain entry to the car. There have been methods proposed to make this more difficult but to date radio is still at the heart of the proposed methods and therefore remains the main weakness.

Accordingly, there is a need for systems, apparatus, and methods that overcome the deficiencies of conventional approaches including the methods, system and apparatus provided hereby.

SUMMARY

The following presents a simplified summary relating to one or more aspects and/or aspects associated with the apparatus and methods disclosed herein. As such, the following summary should not be considered an extensive overview relating to all contemplated aspects and/or aspects, nor should the following summary be regarded to identify key or critical elements relating to all contemplated aspects and/or aspects or to delineate the scope associated with any particular aspect and/or aspect. Accordingly, the following summary has the sole purpose to present certain concepts relating to one or more aspects and/or aspects relating to the apparatus and methods disclosed herein in a simplified form to precede the detailed description presented below.

In one aspect, a first transceiver may include: a first memory; a first processor coupled to the first memory; a first signal source coupled to the first processor, the first signal source configured to generate a signal with a first wavelength greater than 2 meters; and a first antenna coupled to the first signal source, the first antenna comprising a portion of a body and configured to generate a first field.

In another aspect, a first transceiver may include: first means for storing data; first means for processing, the first means for processing coupled to the first means for storing data; first means for generating coupled to the first means for processing, the first means for generating configured to generate a signal with a first wavelength greater than 2 meters; and first means for radiating coupled to the first means for generating, the first means for radiating comprising a portion of a body and configured to generate a first field.

In still another aspect, a method for transceiving may include: generating, by a first signal source, a signal with a first wavelength greater than 2 meters; generating, by a first antenna, a first field, the first antenna comprising a portion of a body and coupled to the first signal source; generating, by a first processor coupled to a first memory, first data; and transmitting the first data using the first antenna.

In still another aspect, a non-transitory computer-readable medium comprising instructions that when executed by a processor cause the processor to perform a method for transceiving comprising: generating, by a first signal source, a signal with a first wavelength greater than 2 meters; generating, by a first antenna, a first field, the first antenna comprising a portion of a body and coupled to the first signal source; generating, by a first processor coupled to a first memory, first data; and transmitting the first data using the first antenna.

In still another aspect, a second transceiver may include: a second memory; a second processor coupled to the second memory; a second signal source coupled to the second processor, the second signal source configured to generate a signal with a second wavelength greater than 2 meters; and a second antenna coupled to the second signal source, the second antenna comprising a portion of a vehicle body and configured to generate a second field.

In still another aspect, a second transceiver may include: second means for storing data; second means for processing, the second means for processing coupled to the second means for storing data; second means for generating coupled to the second means for processing, the second means for generating configured to generate a signal with a second wavelength greater than 2 meters; and second means for radiating coupled to the second means for generating, the second means for radiating comprising a portion of a vehicle body and configured to generate a second field.

In still another aspect, a method for transceiving may include: generating, by a second signal source, a signal with a second wavelength greater than 2 meters; generating, by a second antenna, a second field, the second antenna comprising a portion of a vehicle body and coupled to the second signal source; generating, by a second processor coupled to a second memory, second data; and transmitting the second data using the second antenna or receiving first data using the second antenna.

In still another aspect, a non-transitory computer-readable medium comprising instructions that when executed by a processor cause the processor to perform a method for transceiving comprising: generating, by a second signal source, a signal with a second wavelength greater than 2 meters; generating, by a second antenna, a second field, the second antenna comprising a portion of a vehicle body and coupled to the second signal source; generating, by a second processor coupled to a second memory, second data; and transmitting the second data using the second antenna or receiving first data using the second antenna.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1A:
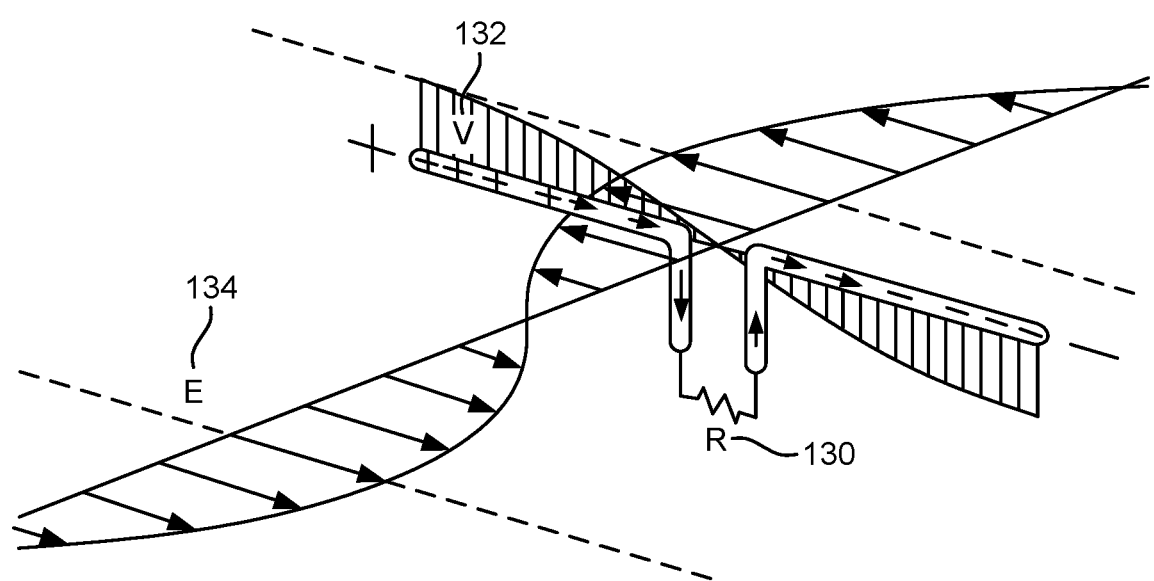
FIGS. 1A and B illustrate antennas in accordance with some aspects of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The methods, apparatus, and systems disclosed herein mitigate shortcomings of the conventional methods, apparatus, and systems, as well as other previously unidentified needs. In some aspects herein, an intentionally non-radiating local electric field (NULEF -E) is used as a means of gaining entry to a car when a near-field device (such as a key fob) is near the car or touching the car body. One technical advantage is that no radio signal is radiated preventing would be thieves from storing any useful entry data from a radio signal and gaining entry to the car. In other aspects herein, an intentionally non -radiating local field (NULEF-E or NULEF-H) is used as a high bandwidth in-car communication system. For instance, a first transceiver may include: a first memory; a first processor coupled to the first memory; a first signal source coupled to the first processor, the first signal source configured to generate a signal with a first wavelength greater than 2 meters; and a first antenna coupled to the first signal source, the first antenna comprising a portion of a body (low efficiency antenna) and configured to generate a first field (a low power field that will not propagate far especially with a low efficiency antenna). It should be understood that while 2 meter wavelength is mentioned, the wavelength threshold may be greater or lesser than 2 meters depending on environmental conditions. For instance, 2 meters is a good threshold for a wavelength of a signal propagating in a vacuum or free space corresponding to a maximum wavelength of 150 MHz. It should also be understood that when utilizing an E field, there will be no associated H field with this E field (such as when the E field is a zero-energy field or generated from a DC supply with low power dissipation).

FIGS. 1A and B illustrate antennas in accordance with some aspects of the disclosure. FIG. 1A shows a dipole antenna connected to a voltage source, V 132 having some source resistance, R 130. The source 132 generates a distribution of charges on the surface of the dipole that will change according to the frequency of the signal from the voltage source 132. When a voltage source 132 is connected to the human body, charges will move over the surface of the skin in a similar way as a dipole. As the height of the human body is usually much shorter than the wavelength of operation a more accurate antenna model is the one shown in FIG. 1B. The human body behaves like a hollow metal cylinder with respect to the E fields generated. Voltages are generated on the antenna, V 132 and changes in charge distribution with time gives rise to currents through the antenna. The charges create E fields and the currents generate H fields. If the E field was measured at any point on the doublet antenna 130 it would be reasonably constant due to the short antenna length with respect to the operating wavelength. (130 and 132 in FIGS. 1A and 1B are equivalent.)

An electrical field 134 is generated in both types of antenna that may be modulated, similar to a radio signal, to transmit and receive data. When using low frequencies (such as 9 MHz to 22 MHz) are used for the voltage 132 frequency and the length of the resistance (such as a human body or portion thereof) is less than 2 meters or less than the frequency length, the body becomes a doublet antenna, in other words a low efficiency radiator. The use of very low power levels results in low power dissipation characteristics, which in turn leaves a very low level of power available for radiation. The combination of low available power and a low efficiency antenna means that possible levels of unintentional radiation will likely be below background noise levels and therefore remotely undetectable. It should be understood that charge builds up along the antenna/body in accordance with the voltage of the driving source. The presence of charged particles along the antenna/body consequently produces an electric field (such as a first field) that extends from the antenna/body and that is detectable with a capacitive transducer (such as a second antenna).

Figure 1B:
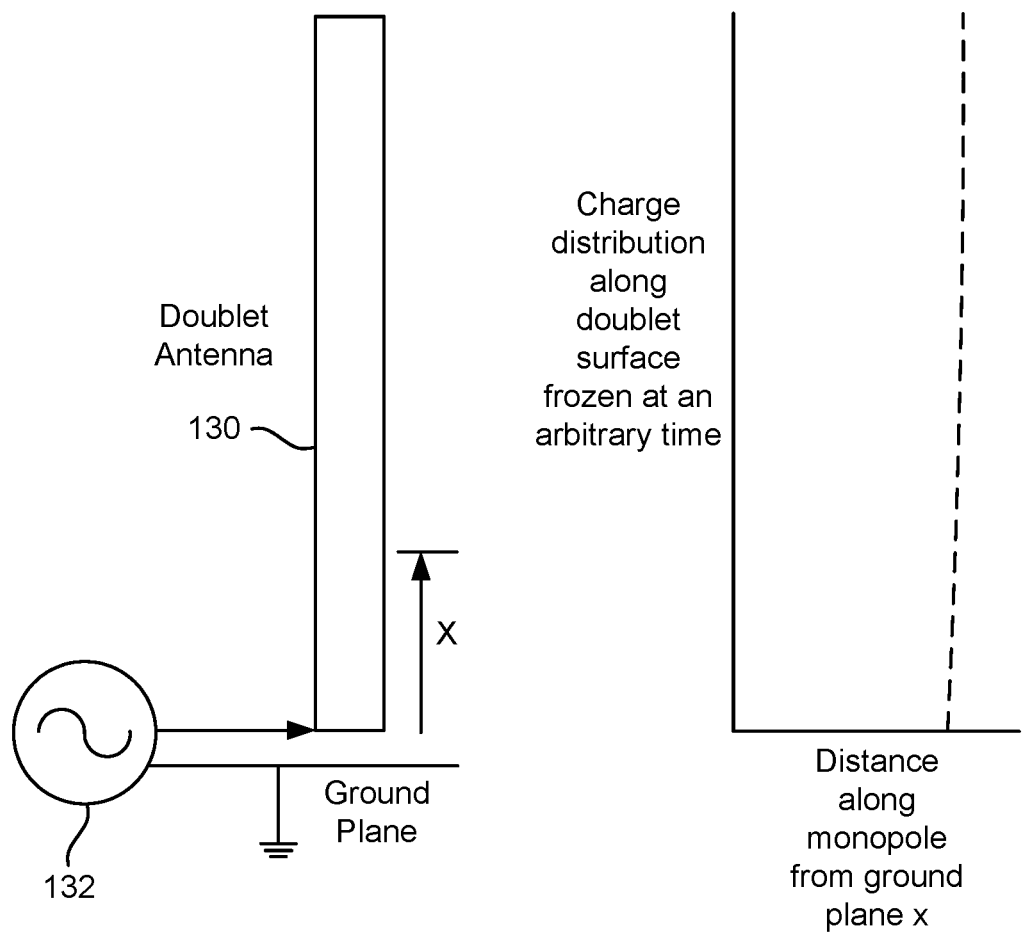

FIG. 1B shows how a voltage source 132 can drive an antenna 130 (a monopole antenna or if the antenna length is much shorter than the wavelength of the frequency of the signal driving source, a doublet antenna) with the charge density of electrons along the antenna 130 being approximately constant at any instant in time and generate an associated electric field around the antenna 130 and is very similar to the effect used in NULEF-E. The voltage source in FIG. 1B does not need the ground connection shown to produce a variable E field on the doublet, similar to the way the dipole of FIG. 1A also does not need an external ground connection.

Figure 2:
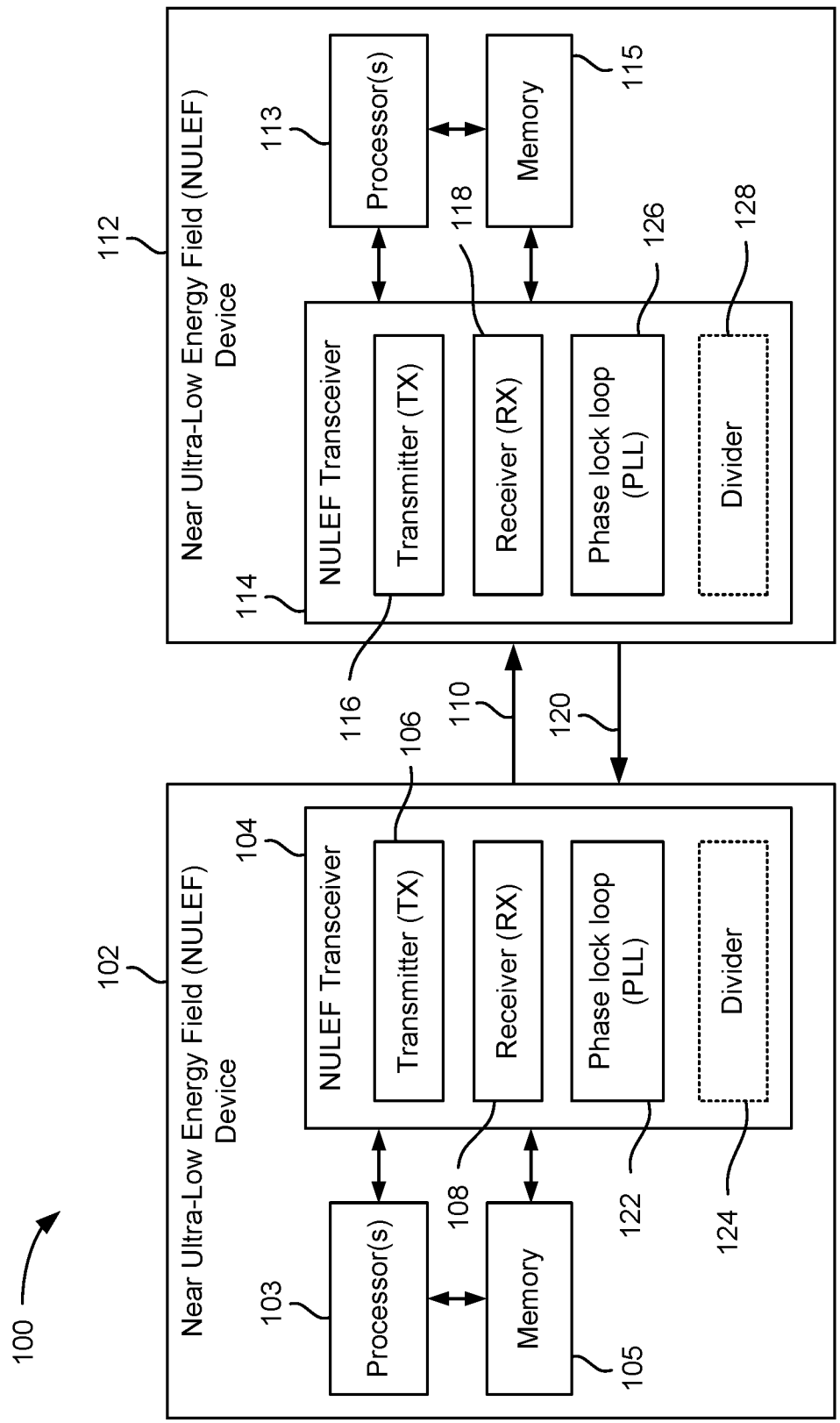
FIG. 2 illustrates a schematic block diagram of a communications system including at least two near-field devices in communication with each other in accordance with some aspects of the disclosure.

FIG. 2 illustrates a schematic block diagram of a communications system including at least two near-field devices in communication with each other in accordance with some aspects of the disclosure. In some aspects, a communication system may use received modulated signal(s) for carrier and/or symbol timing recovery. For instance, the symbol timing recovery estimates a timing offset, and the timing recovery or correction is derived from the timing offset (such as a phase error). The timing offset or a phase error signal may be generated from a modulation constellation distribution. In addition, the carrier frequency of a carrier may be not related in a numerical way to a modulation symbol frequency in some current implementations. The present disclosure relates to inclusion of an unmodulated carrier component into a signal for communication. In an aspect, the proposed wireless communications system (such as a NULEF communications system) may use prior knowledge of a relationship between the symbol timing (such as the modulation symbol frequency or a data clock frequency) and the carrier frequency (modulated or unmodulated), and the carrier and the symbol timing signals may be recovered or extracted from the unmodulated portion of the received modulated carrier instead of using a timing offset or a phase error signal generated from processing of the modulation. In essence, a NULEF communications system may operate similar to Bluetooth (BT) in the industrial, scientific, and medical radio band (ISM band) in that the two approaches have similar problems of interference and degradation. NULEF may use Binary Phase Shift Keying (BPSK), Quadrature Phase Shift Keying (QPSK), or 16 Quadrature Amplitude Modulation (16 QAM), as well as modems and Media Access Controllers (MACs) that are similar to BT and BLE protocols. In another aspect, the process of generating a symbol timing clock from the recovered carrier may generate a phase ambiguity. In an aspect, the phase ambiguity may require a small amount of processing to rectify, and the processing to resolve the phase ambiguity may be part of the coherent carrier and symbol timing recovery.

Additionally, some current communication systems may use multiplicative and/or non-linear processing to recover the frequency or the phase of a received signal. In these systems, a residual carrier frequency offset, a difference between the carrier frequency and a local oscillator (LO) for carrier reception, may be used for symbol timing recovery. In one implementation, a carrier signal may be suppressed if extra power is transmitted on the carrier signal, and such suppression may reduce an error vector magnitude (EVM) and consequently, have a lower bit error rate (BER). In addition, intermodulation may place limits on levels of an unmodulated carrier, which may not be reduced in intensity levels by filtering. However, such limitations may not exist because a NULEF communications system discussed herein may be different from those of conventional EM communication system spectrums, and may not have any of the usual spectrum limitations.

Referring to FIG. 2, a communications system 100 includes at least two NULEF devices 102 and 112. In some aspects, NULEF device 102 may communicate with NULEF device 112 via wireless (such as electric or magnetic) communications 110 and/or 120. In some aspects, multiple NULEF devices including NULEF device 102 may be in E field or H field communication coverage with one or more NULEF devices, including NULEF device 112. In an aspect, NULEF device 102 may transmit and/or receive wireless communications (such as electric or magnetic communications) to and/or from NULEF device 112.

In some aspects, NULEF device 102 or 112 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A NULEF device 102 or 112 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (such as MP3 player), a camera, a game console, a wearable computing device (such as a smart-watch, smart-glasses, a health or fitness tracker, etc.), an appliance, a sensor, a vehicle communication system, a medical device, a vending machine, a device for the Internet-of-Things (IoT), or any other similar functioning device.

According to the present aspects, NULEF device 102 may include one or more processors 103, a memory 105, and/or a NULEF transceiver 104. In some aspects, the NULEF transceiver 104 may have some subcomponents including a transmitter (TX) 106, a receiver (RX) 108, a phase lock loop (PLL) 122, and/or a divider 124 (optional) for operating and/or managing modulation schemes used in NULEF communications according to one or more of the described aspects herein. Similarly, NULEF device 112 may include one or more processors 113, a memory 115, and/or a NULEF transceiver 114. In some aspects, the NULEF transceiver 114 may have some subcomponents including a transmitter (TX) 116, a receiver (RX) 118, a phase lock loop (PLL) 126, and/or a divider 128 (optional) for operating and/or managing modulation schemes used in NULEF communications according to one or more of the described aspects herein. In some aspects, the one or more processors 103 and/or the memory 105 in the NULEF device 102 may operate in combination with the NULEF transceiver 104 for operation or management of certain aspects as described herein. Similarly, the one or more processors 113 and/or the memory 115 in the NULEF device 112 may operate in combination with the NULEF transceiver 114 for operation or management of certain aspects as described herein.

In an aspect, the term "component" as used herein may be one of the parts that make up a system, may be hardware, firmware, and/or software, and may be divided into other components. In some aspects, NULEF transceiver 104/114, TX 106/116, RX 108/118, PLL 122/126, and/or divider 124/128 may be communicatively coupled to one or more additional components (such as one or more processors 103/113 or memory 105/115) for transmitting, receiving, and/or processing radio frequency (RF) and/or electric and magnetic signals.

In an aspect, RX 108/118 may include hardware, firmware, and/or software code executable by a processor (such as processor 103/113) for receiving data, the code comprising instructions and being stored in a memory (such as memory 105/115). The RX 108/118 may be, for instance, a RF or a NULEF receiver.

In another aspect, the TX 106/116 may include hardware, firmware, and/or software code executable by a processor (such as processor 103/113) for transmitting data, the code comprising instructions and being stored in a memory (such as computer-readable medium). The transmitter (TX) 106/116 may be, for instance, a RF or a NULEF transmitter.

In an aspect, the PLL 122/126 may include hardware, firmware, and/or software code executable by a processor (such as processor 103/113) to operate in a TX mode and perform with the TX 106/116, and/or in a RX mode and perform with the RX 108/118. For aspect, when the PLL 122 or 126 is configured to operate in the RX mode according to the instructions being executed by one or more processors 103/113, the PLL 122 or 126 may be enabled to perform a division by a multiple. In an aspect, the multiple may be identified or determined, for instance, as part of enabling the operation of the PLL 122 or 126 in the RX mode. In another aspect, the PLL 122 or 126 may be enabled to perform a multiplication by a multiple, and similarly, the multiple may be identified or determined, for instance, as part of enabling the operation of the PLL 122 or 126 in the RX mode. In an aspect, the multiple may be identified, determined, or indicated by a numerical relationship between the carrier frequency and the data clock frequency according to one or more aspects discussed herein.

In another aspect, the divider 124/128 may include hardware, firmware, and/or software code executable by a processor (such as processor 103/113) to perform a division by a multiple (such as an integer multiple). In an aspect, the multiple may be identified, determined, or indicated by a numerical relationship between the carrier frequency and the data clock frequency according to one or more aspects discussed herein. In an aspect, the divider 124/128 may be implemented separately from the PLL 122/126. In another aspect, the divider 124/128 may be integrated with the PLL 122/126.

In an aspect, various functions related to NULEF transceiver 104/114 may be executed by a single processor, while in other aspects, different ones of the functions may be executed by a combination of two or more different processors. For aspect, in an aspect, one or more processors 103/113 may include any one or any combination of a modem processor, or a baseband processor, or a digital signal processor (DSP), or a transmit processor, or a transceiver processor associated with NULEF transceiver 104/114. In particular, the one or more processors 103/113 may implement components included in the NULEF transceiver 104/114.

In another aspect, one or more processors (such as processor 103/113) in a NULEF device (such as NULEF device 102/112) may execute or process instructions stored in a memory (such as memory 105/115) to assist/support or direct/instruct operation(s) of TX 106/116, RX 108/118, PLL 122/126, and/or divider 124/128. In an aspect, a relationship (such as a numerical relationship or a multiple) may be stored in memory 105/115 and identified by processor 103/113 to instruct PLL 122/126 to perform a signal recovery (such as a data clock or symbol timing recovery). In an aspect, the numerical relationship may indicate that the carrier frequency is a multiple (such as an integer multiple) of the data clock frequency. When the PLL 122/126 is operated in a receive (RX) mode according to the instructions being executed by one or more processors 103/113, the PLL 122/126 may be enabled to perform a multiplication or a division by the multiple in order for the PLL 122/126 to obtain the data clock frequency. In another aspect, a particular relationship (such as a numerical relationship) may be pre-programmed or pre-configured on the PLL 122/126, and the PLL 122/126 may apply, for instance, a proper multiple for the conversion and/or for data clock or symbol timing recovery.

Figure 3:
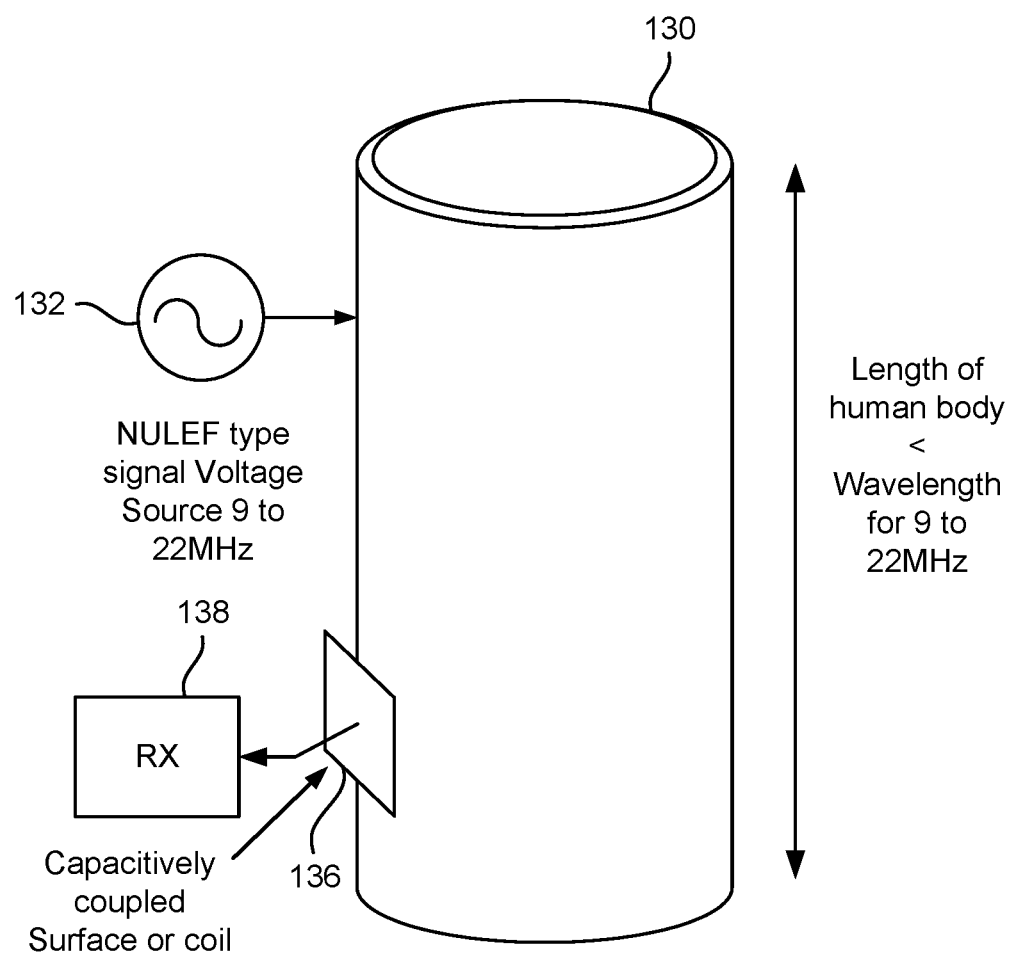
FIG. 3 illustrates a schematic block diagram of a near-field device including a body as an antenna in accordance with some aspects of the disclosure.

FIG. 3 illustrates a schematic block diagram of a near-field device including a body as an antenna in accordance with some aspects of the disclosure. The following equations describes the theory behind the strength of the electric field due to charge gathered at a point, at a line of charge (as in a doublet antenna) and from a surface:

Coulomb's Law:
Two point charges $q1, q2$ separated by distance $r$ $$F = \varepsilon r \cdot \varepsilon 0 \cdot \frac{q1 \cdot q2}{r^2}$$

$E$ Field of Point Charge
The electric field of a point charge is obtained from Coulombs Law $$E = \frac{F}{q} = \varepsilon r \cdot \varepsilon 0 \cdot \frac{Qsource \cdot q}{q \cdot r^2} = \varepsilon r \cdot \varepsilon 0 \cdot \frac{Qsource}{r^2}$$

For a line charge on a wire,
$\lambda$ charge per unit length
$r$ is radius of cylindrical measurement surface $$E = \frac{\lambda}{\varepsilon r \cdot \varepsilon 0 \cdot 2 \cdot \pi \cdot r}$$

For constant surface charge $\sigma$ on an infinite surface $$E = \frac{\sigma}{\varepsilon r \cdot \varepsilon 0 \cdot 2}$$

Magnetic fields fall as the cube of distance which for some applications is an advantage. The electric field for a point charge falls as only the square of distance and will produce a longer-range response. The human body is topologically somewhere between a line charge and a surface charge such that the electric filed close to the body will be independent of distance (for an infinitely wide surface) and falling linearly with distance. The electric field for a vehicle body which is topologically an even better approximation to a conductive cylinder than a human body will also produce an electric field and range like that produced by the human body using NULEF-E.

FIG. 3 demonstrates an implementation of a car access system. The hollow conductive system is topologically the same as a car where the open ends would represent the metal openings in a car such as the windows. A NULEF-E signal source 132 inside a key fob (such as first NULEF device 102) when either: placed within 20 cm of the car body 136; touching the car body 136; or the car owner having the key fob in one hand and placing the owner's hand on the car body 136 would create a signal path from the NULEF-E transmitter in the key fob to the NULEF-E receiver 138 (such as second NULEF device 112) in the car. Paint on the car body 136 may form an insulator and not permit direct metal contact but NULEF-E also works by a capacitive input. In addition, the NULEF-E receiver 138 could either be contacted directly to the car body 136 or capacitively. In addition, the car RX 138 may also become a TX and the car key may become an RX thus permitting further interaction between the car key and a car's processor allowing some complicated interactions that would be hard for a thief to duplicate. Another important feature of using a car as a NULEF-E more effective is the insulating rubber tires. The insulators prevent any charged particles on the surface of the car from leaking to ground.

Figure 4:
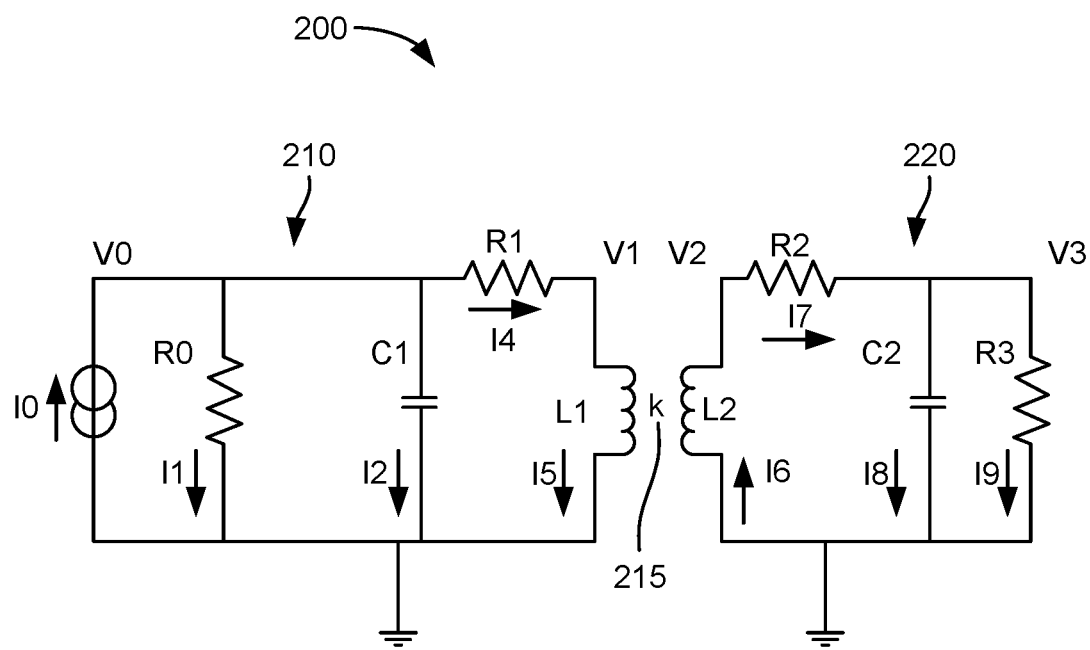
FIG. 4 illustrates a circuit diagram of an input circuit for a near-field device in accordance with some aspects of the disclosure.
Figure 5:
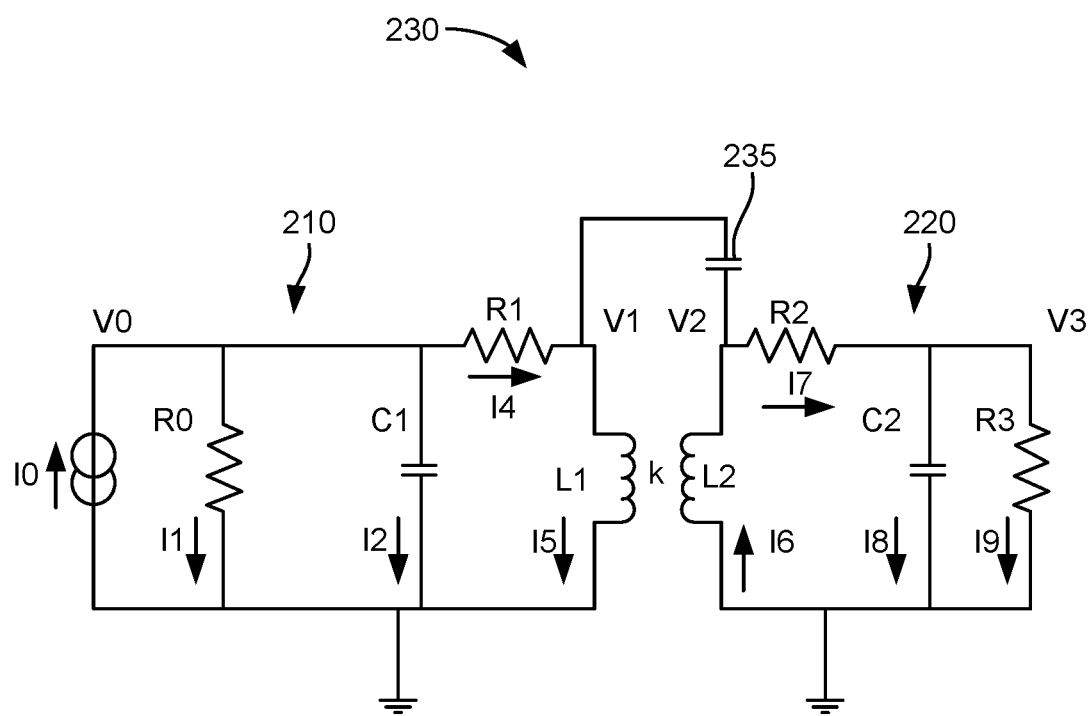
FIG. 5 illustrates another circuit diagram of another input circuit for a near-field device in accordance with some aspects of the disclosure.
Figure 6:
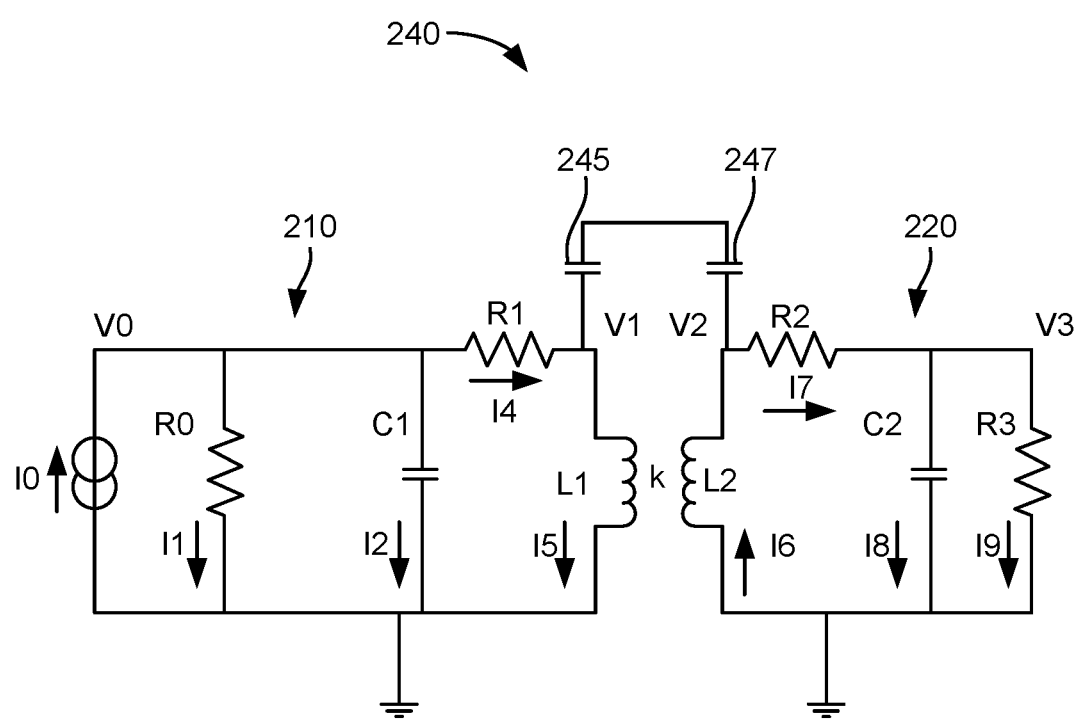
FIG. 6 illustrates another circuit diagram of another input circuit for a near-field device in accordance with some aspects of the disclosure.

FIGS. 4-6 illustrate circuit diagrams of input circuits for near-field devices in accordance with some aspects of the disclosure. FIGS. 4, 5 and 6 show various implementations of the input circuitry to a NULEF transceiver and how NULEF-E and NULEF-H are complementary and can handle either mode of operation wherein the circuit components in the diagrams may be explicit electronic components on a chip or external to a chip. I0 and R0 may be related to the NULEF TX driver device (similar to a power amplifier but referred to as a replenishing amplifier). R0 is used to set the operating bandwidth on the transmit side. R1 is the equivalent series resistance of L1 and C1 is a variable capacitor that tunes NULEF to different channels from nominally 10 to 22 MHz for NULEF-H and much wider for NULEF-E. The same applies for L2 and R2 and C2. R3 represents a resistance that is the LNA input impedance that sets the RF bandwidth on the receive section. When NULEF-H is operating then the magnetic coupling operator k is significant, as in FIG. 4. In FIGS. 5 and 6 NULEF-E is operational. The V1 of the TX generates an E field on the body it connects to. This could be a human body or a car body in the context of this disclosure. For instance, the TX and RX in FIG. 5 may be either the key fob or NULEF transceiver in a car respectively with either a resistive (a short) connection 230 or capacitive 235 connection. Alternatively, FIG. 5 may be viewed the other way around with the RX and TX as the key fob or NULEF transceiver in a car respectively. Both ends may be capacitively coupled as in FIG. 6. The car and the human body act like a piece of wire which is represented in these diagrams as the horizontal piece of wire.

As shown in FIG. 4, a NULEF H field Single Ended TRX circuit 200 may include a first transceiver 210 (such as NULEF device 102) coupled by a magnetic field 215 to a second transceiver 220 (such as NULEF device 112). FIG. 5 illustrates a NULEF E field circuit 230 may include a first transceiver 210 capacitively coupled by an electric field 235 to a second transceiver 220. FIG. 6 illustrates a NULEF E field circuit 240 that may include a first transceiver 210 capacitively coupled by an electric field 245 to a second transceiver 220 through the second transceiver's electrical field 247. As described, from the key fob to the human body, from the human body to the car body and possible from the car body to the NULEF transceiver in the car, there may be capacitive connections. While the diagrams show only one or two series capacitors, there may be three and the ohmic connections may also be used as shown by a connecting wire. Alternatively, ohmic or shorts may be used all the way from the NULEF in the car to the key fob depending on design preferences.

Figure 7:
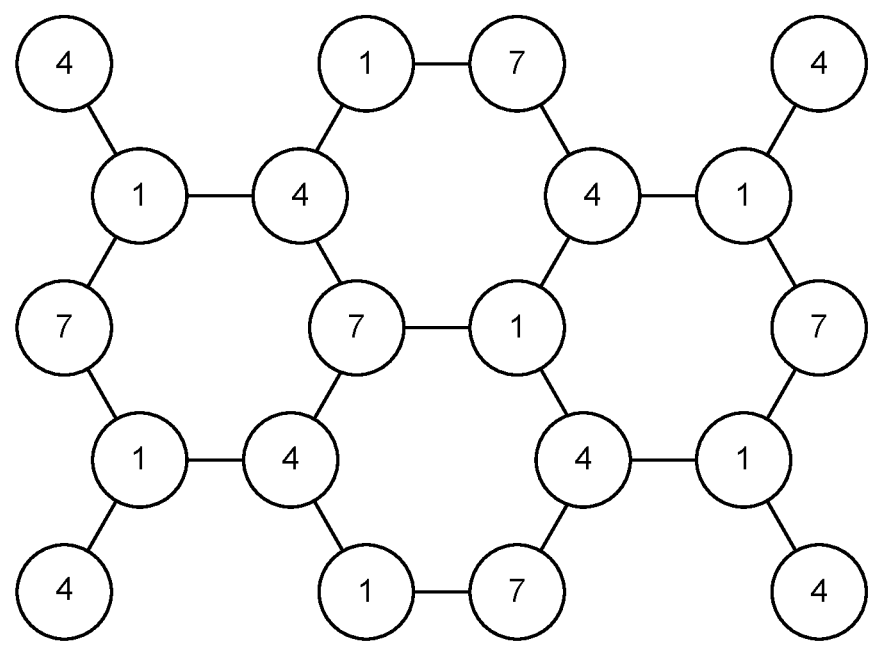
FIG. 7 illustrates a block diagram of near-field devices using different carrier frequencies in accordance with some aspects of the disclosure.

FIG. 7 illustrates a block diagram of near-field devices using different channel frequencies in accordance with some aspects of the disclosure. Standard EM theory shows that for a charged hollow conductive sphere all charge effectively resides on the outside of the car and therefore the electric field will exist from the sphere's surface extending outwards. The openings in a car, such as the windows, will allow the electric field to leak inside the car thus permitting it to be used for communication using NULEF-E by occupants of the car. In addition, a large coil antenna (not shown) that could be placed in one or more car mats, for instance, could also permit occupants of the car to communicate using NULEF-H. However, when multiple vehicles are using NULEF communications in close proximity, a potential for field interference exists. FIG. 7 shows how cars when close together could potentially interfere and the frequency division multiplexing abilities of NULEF will allow different systems to use different channel or frequencies. As shown, some vehicles will operation on a $1^{st}$ channel frequency 1, some will operation on a second channel frequency 4, and some will operation on a third channel frequency 7. If two systems using the same frequency were to come close, this is detectable, and a different channel frequency could then be chosen to avoid interference. This is shown in the diagram by proximate cars having different channel frequencies.

Figure 8:
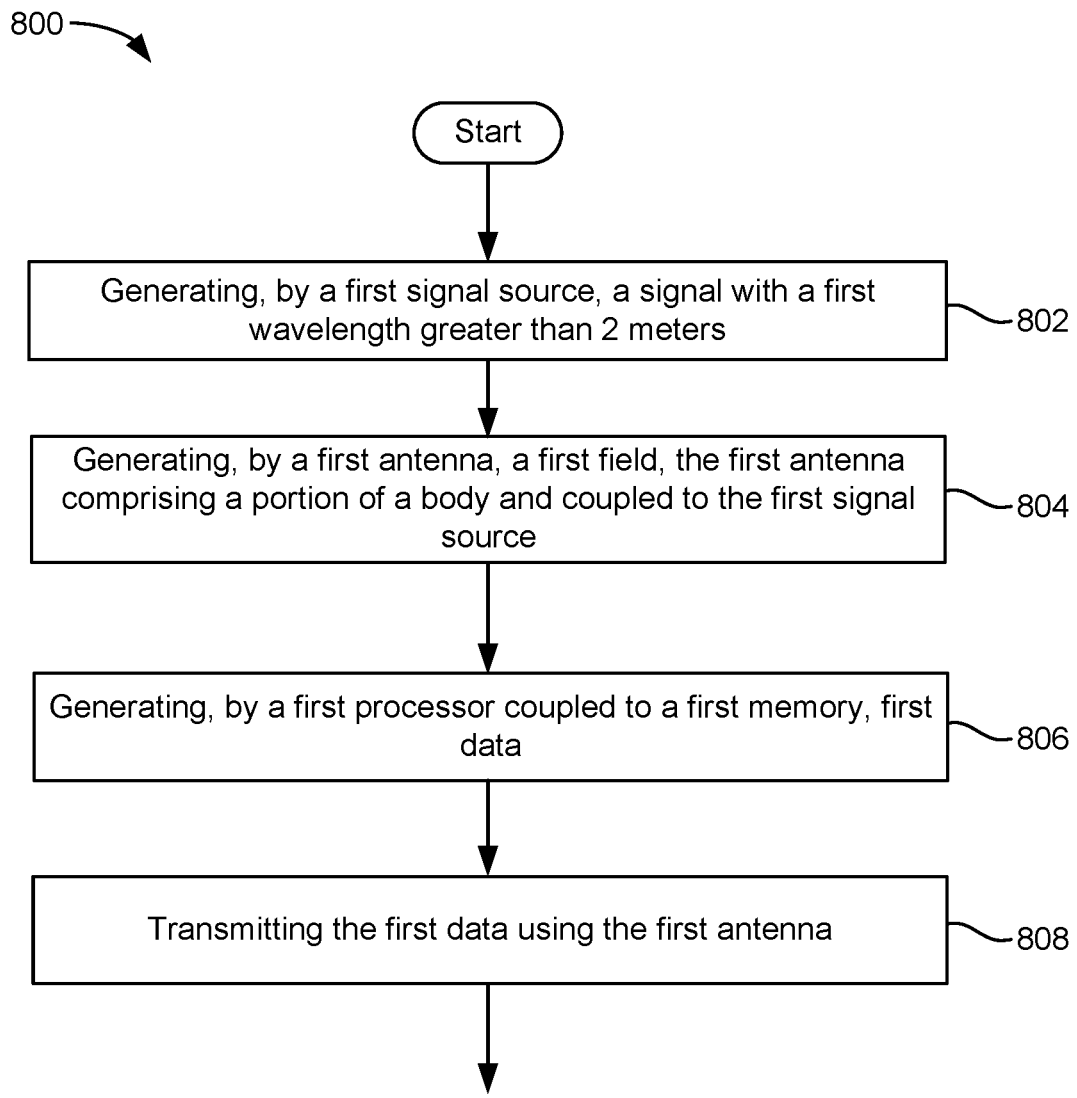
FIG. 8 illustrates a partial method in accordance with some aspects of the disclosure.

FIG. 8 illustrates a partial method in accordance with some aspects of the disclosure. As shown in FIG. 8, the partial method 800 may begin in block 802 with generating, by a first signal source, a signal with a first wavelength greater than 2 meters. The partial method 800 may continue in block 804 with generating, by a first antenna, a first field, the first antenna comprising a portion of a body and coupled to the first signal source. The partial method 800 may continue in block 806 with generating, by a first processor coupled to a first memory, first data. The partial method 800 may conclude in block 808 with transmitting the first data using the first antenna.

Alternatively, the partial method 800 may include wherein: the first field is an electrical field based on the first wavelength and the first processor is configured to transmit the first data using the first signal source and the first antenna; the first field is a modulated electrical field based on the first wavelength and is configured to transmit an access code; the first processor is further configured to receive second data using the first antenna; the first processor is further configured to receive second data using the first antenna from a second field; or wherein the first signal source is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, and a server.

Figure 9:
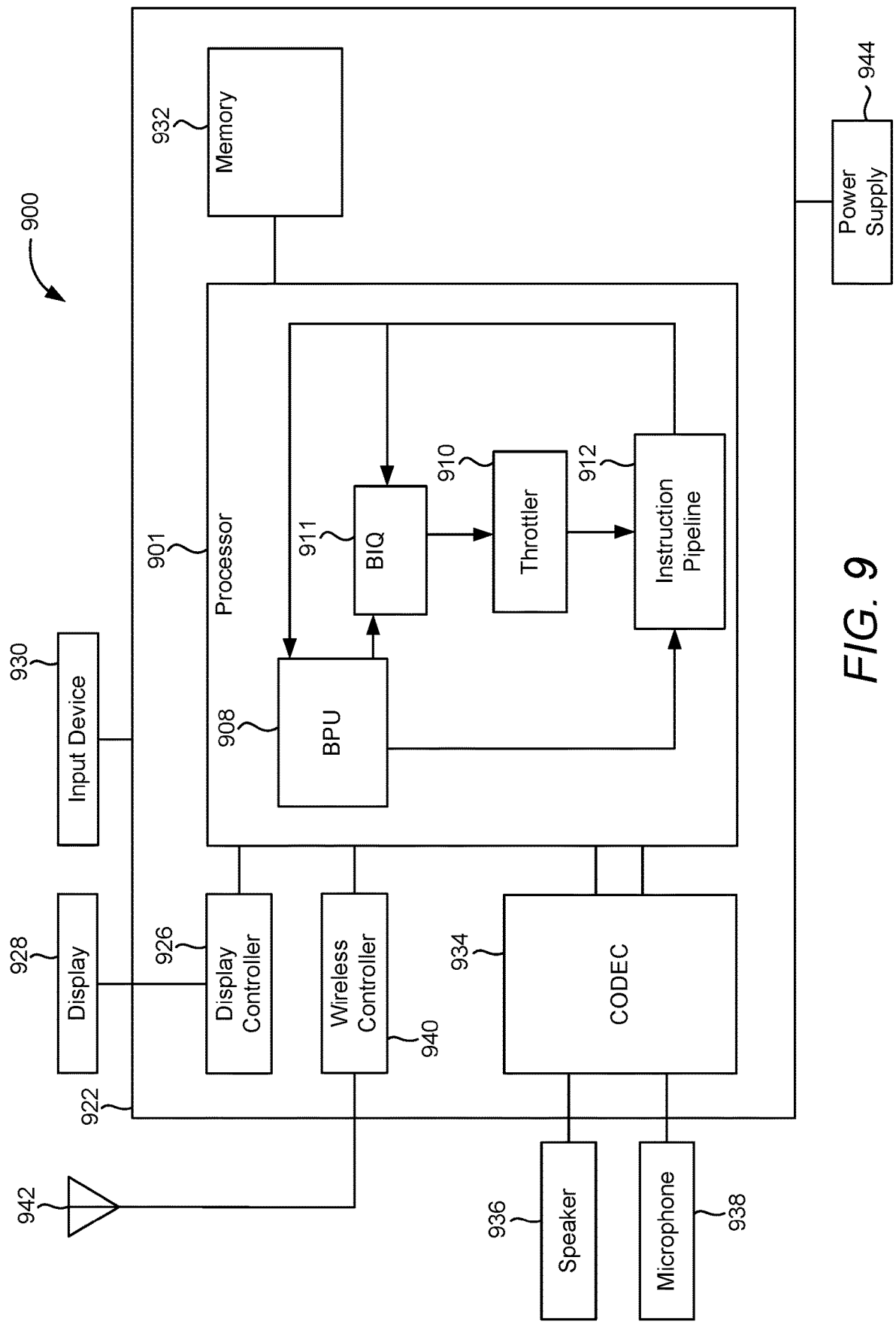
FIG. 9 illustrates a mobile device in accordance with some aspects of the disclosure.

FIG. 9 illustrates a mobile device in accordance with some aspects of the disclosure. Referring now to FIG. 9, a block diagram of a mobile device that is configured according to aspects is depicted and generally designated 900. In some aspects, mobile device 900 may be configured as a wireless communication device. As shown, mobile device 900 includes processor 901, which may be configured to implement the methods described herein in some aspects. Processor 901 is shown to include instruction pipeline 912, buffer processing unit (BPU) 908, branch instruction queue (BIQ) 911, and throttler 910 as is well known in the art. Other well-known details (such as counters, entries, confidence fields, weighted sum, comparator, etc.) of these blocks have been omitted from this view of processor 901 for the sake of clarity.

Processor 901 may be communicatively coupled to memory 932 over a link, which may be a die-to-die or chip-to-chip link. Mobile device 900 also include display 928 and display controller 926, with display controller 926 coupled to processor 901 and to display 928.

In some aspects, FIG. 9 may include coder/decoder (CODEC) 934 (such as an audio and/or voice CODEC) coupled to processor 901; speaker 936 and microphone 938 coupled to CODEC 934; and wireless controller 940 (which may include a modem) coupled to wireless antenna 942 and to processor 901.

In a particular aspect, where one or more of the above-mentioned blocks are present, processor 901, display controller 926, memory 932, CODEC 934, and wireless controller 940 can be included in a system-in-package or system-on-chip device 922. Input device 930 (such as physical or virtual keyboard), power supply 944 (such as battery), display 928, input device 930, speaker 936, microphone 938, wireless antenna 942, and power supply 944 may be external to system-on-chip device 922 and may be coupled to a component of system-on-chip device 922, such as an interface or a controller.

It should be noted that although FIG. 9 depicts a mobile device, processor 901 and memory 932 may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Figure 10:
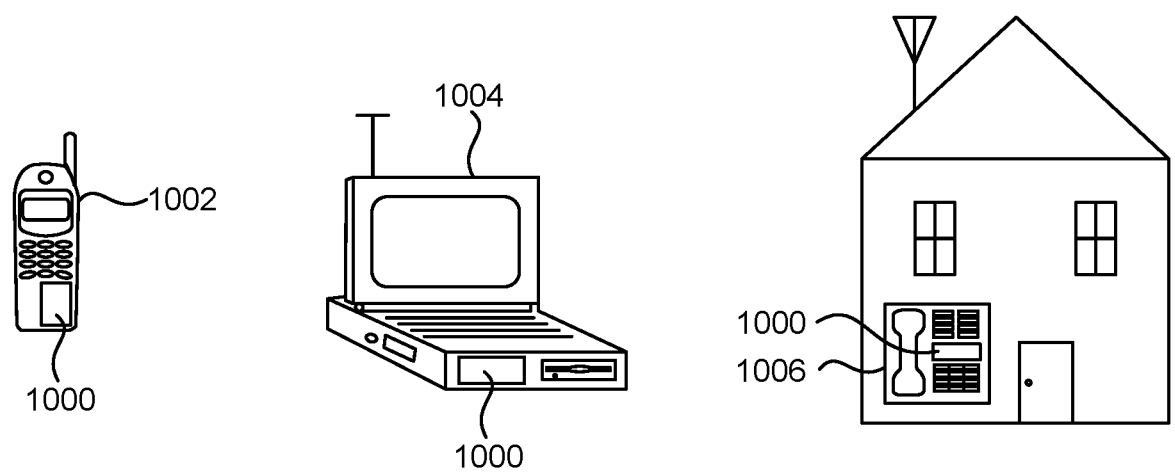
FIG. 10 illustrates various electronic devices that may be integrated with any of the aforementioned methods, devices, semiconductor devices, integrated circuits, die, interposers, packages, or package-on-packages (PoPs) in accordance with some aspects of the disclosure.

FIG. 10 illustrates various electronic devices that may be integrated with any of the aforementioned integrated device, semiconductor device, integrated circuit, die, interposer, package or package-on-package (PoP) in accordance with some aspects of the disclosure. For aspect, a mobile phone device 1002, a laptop computer device 1004, and a fixed location terminal device 1006 may include an integrated device 1000 as described herein. The integrated device 1000 may be, for instance, any of the integrated circuits, dies, integrated devices, integrated device packages, integrated circuit devices, device packages, integrated circuit (IC) packages, package-on-package devices described herein. The devices 1002, 1004, 1006 illustrated in FIG. 10 are merely for illustration. Other electronic devices may also feature the integrated device 1000 including, but not limited to, a group of devices (such as electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (such as autonomous vehicles), or any other device that stores or retrieves data or computer instructions, or any combination thereof.

It will be appreciated that various aspects disclosed herein can be described as functional equivalents to the structures, materials and/or devices described and/or recognized by those skilled in the art. It should furthermore be noted that methods, systems, and apparatus disclosed in the description or in the claims can be implemented by a device comprising means for performing the respective actions of this method. For instance, in one aspect, a first transceiver may include: first means for storing data (such as a first memory); first means for processing (such as a first processor), the first means for processing coupled to the first means for storing data; first means for generating (such as a first signal source) coupled to the first means for processing, the first means for generating configured to generate a signal with a first wavelength greater than 2 meters; and first means for radiating (such as a first antenna) coupled to the first means for generating, the first means for radiating comprising a portion of a body and configured to generate a first field. In another aspect, a second transceiver may include: second means for storing data (such as a second memory); second means for processing (such as a second processor), the second means for processing coupled to the second means for storing data; second means for generating (such as a second signal source) coupled to the second means for processing, the second means for generating configured to generate a signal with a second wavelength greater than 2 meters; and second means for radiating (such as a second antenna) coupled to the second means for generating, the second means for radiating comprising a portion of a body and configured to generate a second field.

One or more of the components, processes, features, and/or functions illustrated in FIGS. 1-10 may be rearranged and/or combined into a single component, process, feature or function or incorporated in several components, processes, or functions. Additional elements, components, processes, and/or functions may also be added without departing from the disclosure. It should also be noted that FIGS. 1-10 and its corresponding description in the present disclosure is not limited to dies and/or ICs. In some implementations, FIGS. 1-10 and its corresponding description may be used to manufacture, create, provide, and/or produce integrated devices. In some implementations, a device may include a die, an integrated device, a die package, an integrated circuit (IC), a device package, an integrated circuit (IC) package, a wafer, a semiconductor device, a package on package (PoP) device, and/or an interposer. An active side of a device, such as a die, is the part of the device that contains the active components of the device (e.g. transistors, resistors, capacitors, inductors etc.), which perform the operation or function of the device. The backside of a device is the side of the device opposite the active side. As used herein, a metallization structures may include metal layers, vias, pads, or traces with dielectric between, such as a redistribution layer or RDL).

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms include, but are not limited to, a music player, a video player, an entertainment unit, a navigation device, a communications device, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (such as wireless, cellular, infrared, short-range radio, etc.). These terms are also intended to include devices which communicate with another device that can receive wireless communication and/or navigation signals such as by short-range wireless, infrared, wire line connection, or other connection, regardless of whether satellite signal reception, assistance data reception, and/or position-related processing occurs at the device or at the other device. In addition, these terms are intended to include all devices, including wireless and wire line communication devices, that are able to communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (such as based on IEEE 802.11, etc.) and so on. UEs can be embodied by any of a number of types of devices including but not limited to printed circuit (PC) cards, compact flash devices, external or internal modems, wireless or wire line phones, smartphones, tablets, tracking devices, asset tags, and so on. A communication link through which UEs can send signals to a RAN is called an uplink channel (such as a reverse traffic channel, a reverse control channel, an access channel, etc.). A communication link through which the RAN can send signals to UEs is called a downlink or forward link channel (such as a paging channel, a control channel, a broadcast channel, a forward traffic channel, etc.). As used herein the term traffic channel (TCH) can refer to an uplink/reverse or downlink/forward traffic channel.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), Bluetooth (BT), Bluetooth Low Energy (BLE), IEEE 802.11 (WiFi), and IEEE 802.15.4 (Zigbee/Thread) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5 (both expressly incorporated herein in their entirety).

The word "exemplary" is used herein to mean "serving as an aspect, instance, or illustration." Any details described herein as "exemplary" is not to be construed as advantageous over other aspects. Likewise, the term "aspects" does not mean that all aspects include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular aspects and is not intended to be limiting of aspects of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can include one or more elements.

Those skilled in the art will appreciate that information and signals may be represented using any of a variety of different technologies and techniques. For aspect, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (such as a combination of a DSP and a microprocessor, a plurality of microprocessors, one or more microprocessors in conjunction with a DSP core, or other such configurations). Additionally, these sequence of actions described herein can be considered to be incorporated entirely within any form of computer-readable storage medium (transitory and non-transitory) having stored therein a corresponding set of computer instructions that upon execution would cause an associated processor to perform the functionality described herein. Thus, the various aspects of the disclosure may be incorporated in a number of different forms, all of which have been contemplated to be within the scope of the claimed subject matter. In addition, for each of the aspects described herein, the corresponding form of any such aspects may be described herein as, for instance, "logic configured to" perform the described action.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the aspects disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. A storage medium is coupled to the processor such that the processor can read information from, and write information to, the storage medium. In the alternative, the storage medium may be integral to the processor.

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for instance, a microprocessor, a programmable computer or an electronic circuit. In some aspects, some or a plurality of the most important method actions can be performed by such an apparatus.

In the detailed description above it can be seen that different features are grouped together in aspects. This manner of disclosure should not be understood as an intention that the claimed aspects have more features than are explicitly mentioned in the respective claim. Rather, the disclosure may include fewer than all features of an individual aspect disclosed. Therefore, the following claims should hereby be deemed to be incorporated in the description, wherein each claim by itself can stand as a separate aspect. Although each claim by itself can stand as a separate aspect, it should be noted that-although a dependent claim can refer in the claims to a specific combination with one or a plurality of claims-other aspects can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

Furthermore, in some aspects, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative aspects of the disclosure, it should be noted that various changes and modifications could be made herein without departing from the scope of the disclosure as defined by the appended claims. The functions and/or actions of the method claims in accordance with the aspects of the disclosure described herein need not be performed in any particular order. Additionally, well-known elements will not be described in detail or may be omitted so as to not obscure the relevant details of the aspects and aspects disclosed herein. Furthermore, although elements of the disclosure may be described or claimed in the singular, the plural is contemplated unless limitation to the singular is explicitly stated.

What is claimed is:

1. A first transceiver comprising:
   a first memory;
   a first processor coupled to the first memory;
   a first signal source coupled to the first processor, the first signal source configured to generate a signal with a first wavelength greater than 2 meters; and
   a first antenna coupled to the first signal source, the first antenna comprising a portion of a body and configured to generate a first field,
   wherein the signal is transmitted over the first field, the signal including an access code, and wherein the first field is a modulated electrical field based on the first wavelength and is configured to transmit the access code, the first field being carried via capacitance or via contact with an external body.

2. The first transceiver of claim 1, wherein the first field is based on the first wavelength and the first processor is configured to transmit first data using the first signal source and the first antenna.

3. The first transceiver of claim 1, wherein the first processor is further configured to receive second data using the first antenna.

4. The first transceiver of claim 1, wherein the first processor is further configured to receive second data using the first antenna from a second field.

5. The first transceiver of claim 1, wherein the first transceiver is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, and a server.

6. A first transceiver comprising:
   first means for storing data;
   first means for processing, the first means for processing coupled to the first means for storing data;
   first means for generating coupled to the first means for processing, the first means for generating configured to generate a signal with a first wavelength greater than 2 meters; and
   first means for radiating coupled to the first means for generating, the first means for radiating comprising a portion of a body and configured to generate a first field,
   wherein the signal is transmitted over the first field, the signal including an access code, and wherein the first field is a modulated electrical field based on the first wavelength and is configured to transmit the access code, the first field being carried via capacitance or via contact with an external body.

7. The first transceiver of claim 6, wherein the first field is based on the first wavelength and the first means for processing is configured to transmit first data using the first means for generating and the first means for radiating.

8. The first transceiver of claim 6, wherein the first means for processing is further configured to receive second data using the first means for radiating.

9. The first transceiver of claim 6, wherein the first means for processing is further configured to receive second data using the first means for radiating from a second field.

10. The first transceiver of claim 6, wherein the first transceiver is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, and a server.

11. A method for transceiving, the method comprising:
generating, by a first signal source, a signal with a first wavelength greater than 2 meters;
generating, by a first antenna, a first field, the first antenna comprising a portion of a body and coupled to the first signal source;
generating, by a first processor coupled to a first memory, first data; and
transmitting the first data using the first antenna,
wherein the signal is transmitted over the first field, the signal including an access code, and wherein the first field is a modulated electrical field based on the first wavelength and is configured to transmit the access code, the first field being carried via capacitance or via contact with an external body.

12. The method of claim 11, wherein the first field is based on the first wavelength and the first processor is configured to transmit the first data using the first signal source and the first antenna.

13. The method of claim 11, wherein the first processor is further configured to receive second data using the first antenna.

14. The method of claim 11, wherein the first processor is further configured to receive second data using the first antenna from a second field.

15. The method of claim 11, wherein the first signal source is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, and a server.

16. A non-transitory computer-readable medium comprising instructions that when executed by a processor cause the processor to perform a method for transceiving, the method comprising:
generating, by a first signal source, a signal with a first wavelength greater than 2 meters;
generating, by a first antenna, a first field, the first antenna comprising a portion of a body and coupled to the first signal source;
generating, by a first processor coupled to a first memory, first data; and
transmitting the first data using the first antenna,
wherein the signal is transmitted over the first field, the signal including an access code, and wherein the first field is a modulated electrical field based on the first wavelength and is configured to transmit the access code, the first field being carried via capacitance or via contact with an external body.

17. The non-transitory computer-readable medium of claim 16, wherein the first field is based on the first wavelength and the first processor is configured to transmit the first data using the first signal source and the first antenna.

18. The non-transitory computer-readable medium of claim 16, wherein the first processor is further configured to receive second data using the first antenna.

19. The non-transitory computer-readable medium of claim 16, wherein the first processor is further configured to receive second data using the first antenna from a second field.

20. The non-transitory computer-readable medium of claim 16, wherein the first signal source is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, and a server.

21. A second transceiver comprising:
a second memory;
a second processor coupled to the second memory;
a second signal source coupled to the second processor, the second signal source configured to generate a signal with a second wavelength greater than 2 meters; and
a second antenna coupled to the second signal source, the second antenna comprising a portion of a vehicle body and configured to generate a second field,
wherein the signal is transmitted over the second field, the signal including an access code, and
wherein the second field is a modulated electrical field based on the second wavelength and is configured to transmit the access code, the second field being carried via capacitance or via contact with an external body separate from the vehicle body.

22. A second transceiver comprising:
second means for storing data;
second means for processing, the second means for processing coupled to the second means for storing data;
second means for generating coupled to the second means for processing, the second means for generating configured to generate a signal with a second wavelength greater than 2 meters; and
second means for radiating coupled to the second means for generating, the second means for radiating comprising a portion of a vehicle body and configured to generate a second field,
wherein the signal is transmitted over the second field, the signal including an access code, and
wherein the second field is a modulated electrical field based on the second wavelength and is configured to transmit the access code, the second field being carried via capacitance or via contact with an external body separate from the vehicle body.

23. A method for transceiving, the method comprising:
generating, by a second signal source, a signal with a second wavelength greater than 2 meters;
generating, by a second antenna, a second field, the second antenna comprising a portion of a vehicle body and coupled to the second signal source;
generating, by a second processor coupled to a second memory, second data; and transmitting the second data using the second antenna or receiving first data using the second antenna, wherein the signal is transmitted over the second field, the signal including an access code, and wherein the second field is a modulated electrical field based on the second wavelength and is configured to transmit the access code, the second field being carried via capacitance or via contact with an external body separate from the vehicle body.

24. A non-transitory computer-readable medium comprising instructions that when executed by a processor cause the processor to perform a method for transceiving, the method comprising:

generating, by a second signal source, a signal with a second wavelength greater than 2 meters;

generating, by a second antenna, a second field, the second antenna comprising a portion of a vehicle body and coupled to the second signal source;

generating, by a second processor coupled to a second memory, second data; and transmitting the second data using the second antenna or receiving first data using the second antenna, wherein the signal is transmitted over the second field, the signal including an access code, and wherein the second field is a modulated electrical field based on the second wavelength and is configured to transmit the access code, the second field being carried via capacitance or via contact with an external body separate from the vehicle body.

* * * * *